Jan. 19, 1932.  J. W. MEAD ET AL  1,842,042
LAMP
Filed May 3, 1930

J. W. Mead
Louis Hoerner
INVENTOR

BY Victor J. Evans
ATTORNEY

Arthur Crane Jr.
WITNESS

Patented Jan. 19, 1932

1,842,042

UNITED STATES PATENT OFFICE

JOHN WILLIAM MEAD AND LOUIS HOERNER, OF BUFFALO, NEW YORK

LAMP

Application filed May 3, 1930. Serial No. 449,611.

This invention relates to certain new and useful improvements in stand and support construction embodying among other characteristics means for maintaining the several parts against displacement.

Another object of the invention contemplates the provision and arrangement of means for supporting ornamental portions upon the stand.

Another object of the invention consists of adjusting means for the stand operable upon and without injury to the ornamental portion.

More specifically stated the stand is provided with articles of ornamentation other than that of the ornamental portion obscuring from view of the several connections.

With the above and other objects in view, the invention further consists of the following novel features and details of construction, to be hereinafter more fully described, illustrated in the accompanying drawings and pointed out in the appended claim.

In the drawings:—

Figure 1:
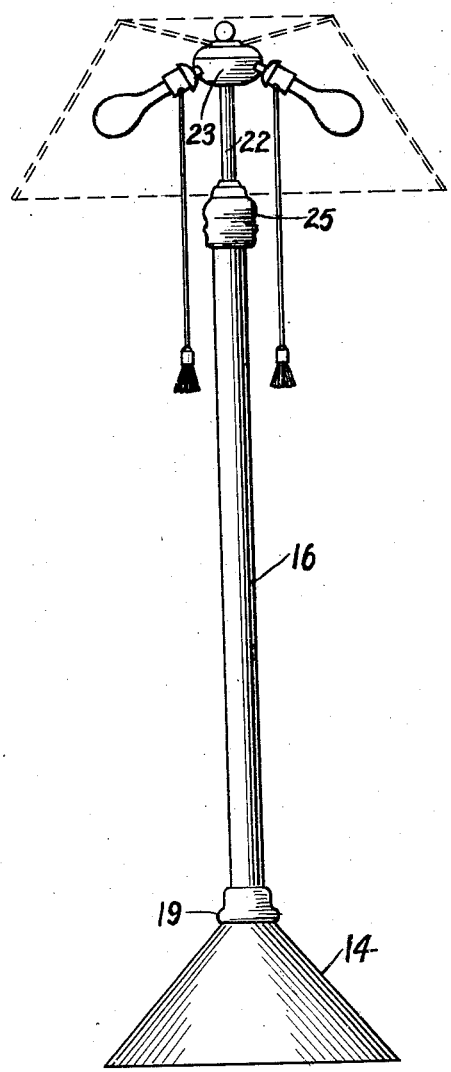
Figure 1 is an elevation of a lamp construction assembled in a manner described by the invention.
Figure 2:
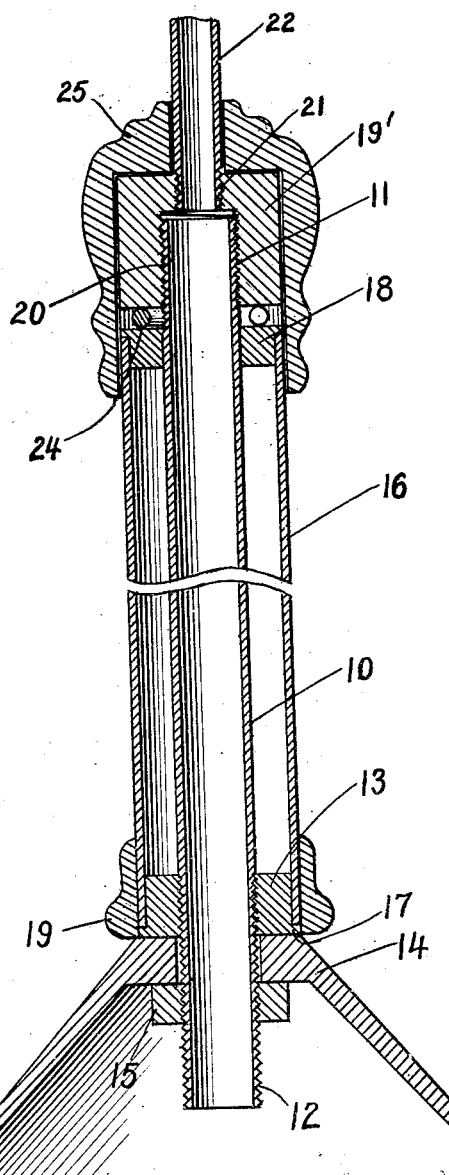
Figure 2 is an enlarged fragmentary longitudinal sectional view taken through the stand or support construction.
Figure 4:
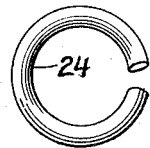
Figure 4 is a top plan view of said element.
Figure 3:
Figure 3 is a side elevation of the yieldable locking element.

Referring to the drawings in detail wherein like characters of reference denote corresponding parts, the reference character 10 indicates generally a length of the conventional form of gas or other pipe being exteriorly threaded, as at 11 and 12, adjacent the ends thereof. A collar member 13 threadedly engaged with the threaded portion 12 adjacent the lowermost end of the pipe 10 reposes upon the upper portion of a base member 14 whereas the depending portion of said pipe projects through the base to accommodate a nut or other fastening, indicated as at 15.

A length of ornamental tubing 16 telescopically associated with the pipe 10 is seated at its lower periphery upon an annular flange portion 17 carried by the collar 13. A collar member 18, constructed after the manner of and oppositely disposed with relation to the collar 13 and slidably mounted upon the pipe 10 is engaged with the ornamental tubing 16 to space same from the immediate portion of the pipe 10. A cap 19 of ornamental design is then shifted downwardly over the ornamental tubing 16 to repose upon the adjacent portion of the base 14 to obscure the several connections from view.

An adjusting collar 19 having counter bores 20 and 21 respectively accommodates the uppermost threaded portion 11 of the pipe 10 and the lowermost depending extremity of a tubular member 22 supporting an outlet 23. A lock washer 24 of split annular and spherical shape in cross section is interposed between the adjacent faces of the collar 18 and the adjustable collar member 19. At this intance, it may be stated that lamp standards, standards for bird cages and other forms of supports now being constructed, the iron pipe is threaded into the iron base, the outer decorative or ornamental tubing is then slipped over the pipe and the fittings to hold the bulbs and shade are screwed on the upper end of the pipe tight against the ornamental tubing. This does not make a good job as the tightening pressure causes the thin ornamental tubing to twist or become otherwise distorted, frequently buckling and in a short time the upper portion of the stand carrying the lighting fixtures as well as the tubing is loose and the lamp is crooked and in the event the lamp or bird cage stand has breaks or ornaments the effect will be worse yet.

In the present invention the adjusting collar 19 may be shifted rectilinearly of the pipe 10 to flatten out or otherwise align the ends of the split washer 24 and such pressure will be enough to hold the tubing firmly and against buckling.

It is obviously apparent that the ornamental cap 25 is to be applied previous to the mounting and wiring of the outlet fixture 23 whereby the adjusting connection will be entirely obscured from view to prevent detraction from the ornamental design of the stand.

Due to the fact that the uppermost collar 18 is slidably connected with the pipe 10 only the yielding tension from the washer 14 is delivered or otherwise transmitted to the ornamental tubing 16.

The invention is susceptible of various changes in its form, proportions and minor details of construction, and the right is herein reserved to make such changes as properly fall within the scope of the appended claim.

Having described the invention, what is claimed is:

A stand construction and assemblage therefor comprising a base having a pipe extended axially therethrough, collars located adjacent the ends of the pipe having threaded and slidable connection therewith, flanges of annular contour projecting peripherally of the collars supporting a tubing of ornamental formation therebetween enclosing said pipe and collars, a nut threadedly engaged with the lowermost depending end of the pipe within the base rigidly binding the latter against the immediate collar, a yieldable locking element encircling the uppermost projecting portion of the pipe and reposing upon the outer side of the slidably mounted collar, and an adjusting collar mounted upon the last mentioned end of the pipe having engagement with said locking element to exercise yieldable tightening stress against the ornamental tubing.

In testimony whereof we affix our signatures.

JOHN WILLIAM MEAD.
LOUIS HOERNER.